United States Patent
Pigouche et al.

(10) Patent No.: US 8,415,599 B2
(45) Date of Patent: Apr. 9, 2013

(54) DEVICE FOR MEASURING THE DEFECTS OF AN IMAGING INSTRUMENT WITH TWO OPTO-ELECTRONIC SENSORS

(75) Inventors: Olivier Pigouche, Grasse (FR); Didier Dantes, Valbonne (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 12/742,614

(22) PCT Filed: Nov. 7, 2008

(86) PCT No.: PCT/EP2008/065133
§ 371 (c)(1),
(2), (4) Date: Jul. 13, 2010

(87) PCT Pub. No.: WO2009/062890
PCT Pub. Date: May 22, 2009

(65) Prior Publication Data
US 2010/0278378 A1   Nov. 4, 2010

(30) Foreign Application Priority Data
Nov. 13, 2007   (FR) ..................... 07 07967

(51) Int. Cl.
*G06K 9/00* (2006.01)
*G02B 27/64* (2006.01)

(52) U.S. Cl.
USPC ............... 250/201.2; 250/201.8; 250/201.9; 250/208.1; 356/121; 356/624; 382/103

(58) Field of Classification Search ............... 250/208.1, 250/201.2, 201.3, 201.4, 201.8, 201.9; 356/435, 356/121, 609, 624; 382/103
See application file for complete search history.

(56) References Cited

U.S. PATENT DOCUMENTS

| | | | |
|---|---|---|---|
| 5,610,707 A * | 3/1997 | Duncan et al. | 356/121 |
| 6,771,422 B1 | 8/2004 | Clark | |
| 7,531,774 B2 * | 5/2009 | Paxman et al. | 250/201.9 |
| 2005/0270611 A1 | 12/2005 | Oshiro et al. | |
| 2007/0102620 A1 | 5/2007 | Bublitz et al. | |

FOREIGN PATENT DOCUMENTS

| | | |
|---|---|---|
| JP | 57-019703 A | 2/1982 |
| JP | 08-334668 A | 12/1996 |
| JP | 10-227971 A | 8/1998 |

* cited by examiner

*Primary Examiner* — Kevin Pyo
(74) *Attorney, Agent, or Firm* — Baker Hostetler LLP

(57) ABSTRACT

The present invention relates to a device for measuring defects of an imaging instrument with a sensor that is accurate, simple to produce and implement and inexpensive. According to the invention, this device comprising at least one second sensor, similar to the first, inclined relative thereto and imaging the same region as the first sensor, and a device for calculating the defocusing of each element of this other sensor.

12 Claims, 1 Drawing Sheet

DEVICE FOR MEASURING THE DEFECTS OF AN IMAGING INSTRUMENT WITH TWO OPTO-ELECTRONIC SENSORS

CROSS-REFERENCE TO RELATED APPLICATIONS

This application is a National Stage of International patent application PCT/EP2008/065133, filed on Nov. 11, 2008, which claims priority to foreign French patent application No. FR 07 07967, filed on Nov. 13, 2007, the disclosures of which are incorporated by reference in their entirety.

FIELD OF THE INVENTION

The present invention relates to a device for measuring defects of an imaging instrument with opto-electronic sensor, as well as a device for correcting defects including such a measuring device.

BACKGROUND OF THE INVENTION

An optical instrument, such as a telescope, placed in an orbiting observation satellite, may become defocused, particularly under the thermoelastic effects and the offgassing of the structure.

The need to have a good contrast in the images implies accurately measuring this defocusing and installing a refocusing device that will be activated according to the result of the measurement.

According to the prior art, these defocusing determination problems were solved in different ways:
   by comparison with simulations made with different defocusing levels, but such a method is not very accurate,
   by analyzing the wave surface, but this can be implemented only with a complex system,
   by making use of a measurement method consisting in varying the refocusing mechanism and selecting the best focusing, but implementing this is complex,
      using a specific device or a line optical divider (called "DIVOLI").

This device requires peer detectors to be perfectly optically aligned on the ground and also introduces glass into the optical combination.

Moreover, a method called "phase diversity" is known, which, starting from an image of an object and the image of the same object defocused relative to the first image with a known defocusing delta using an additional sensor usually defocused by a fraction of a wavelength, or using an action on the focusing mechanism, implements a specific algorithm used to return not only to the defocusing but also to the other conventional optical aberrations.

The document JP 10 227971 A discloses a focusing device comprising an optical flux divider, in which a detection strip is moved relative to a better optical focusing plane, which complicates its implementation and makes it sensitive to accelerations, and impairs its reliability in a space environment.

Furthermore, the documents U.S. 2005/0270611 A1 and U.S. 2007/0102620 disclose microscopes with focusing determination devices comprising light beam splitters and a piezoelectric mechanism for the device of the first of these two documents, which makes these devices relatively bulky and difficult to transpose for space use with telescopes.

SUMMARY OF THE INVENTION

The subject of the present invention is a device for measuring defects, such as the optical aberrations of an imaging instrument with opto-electronic sensor comprising a number of detector elements that is accurate, simple to produce and implement and as inexpensive and small as possible, as well as a device for correcting defects implementing such a measuring device, without these devices running the risk of jamming in space. Furthermore, in a space environment, the mechanisms nm the risk of jamming, which may be difficult to detect in tests on Earth, in particular because of different gravities and temperatures. It should also be noted that the movements of mechanisms may cause the satellites that include them to vibrate, which is a nuisance when the instruments mounted onboard these satellites are imagers.

The device according to the invention is a static device which is characterized in that it comprises at least one second sensor positioned in a plane that is inclined relative to the plane containing the first sensor and relative to the optical axis of the imaging instrument and imaging the same region as the first sensor, and a device for calculating the optical aberrations affecting each element of the two sensors, this inclined plane including a straight line linking the two sensors and contained within said plane containing the first sensor.

Obviously, the expression "static device" should be understood to mean that the device of the invention, unlike the known devices, does not feature successive refocusing operations and does not include movement of an optical component, which makes the device of the invention simpler and less fragile than these known devices.

BRIEF DESCRIPTION OF THE DRAWINGS

The present invention will be better understood from reading the detailed description of an embodiment, taken as a nonlimiting example and illustrated by the appended drawing in which.

DETAILED DESCRIPTION

Figure 1:
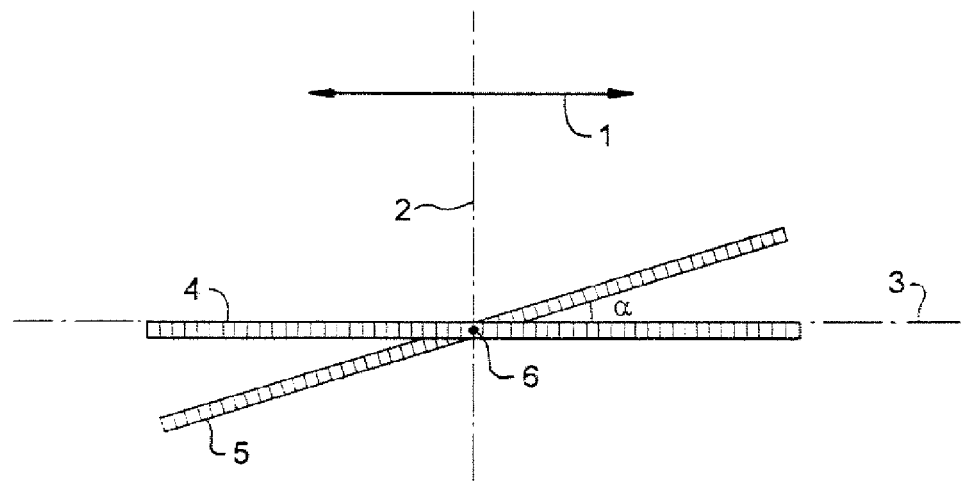
FIG. 1 is a very simplified diagram of a side view of a device for implementing the method of the invention.

The present invention is described hereinbelow with reference to an opto-electronic instrument such as a telescope with opto-electronic sensor positioned onboard an observation satellite, in which the defect to be corrected is a defocusing, but obviously the invention is not limited to this sole application, and it can be implemented for equipment on the ground or onboard flying craft other than satellites (airplanes, helicopters or drones), and such equipment comprises telescopes or other opto-electronic equipment, and the defects thereof to be corrected are the defocusing or other types of optical defects, in particular defects such as astigmatism, spherical aberration and coma. To correct these other defects, a transfer function will then be determined, dependent on the optical combination which, for a set of measured aberrations, can be used to find the best corrections in terms of deformations and movements of the telescope's optical elements.

Furthermore, the invention is described hereinbelow with reference to a satellite for which the images are acquired according to the "push broom" technique (scanning of the region to be imaged), but obviously it is not limited to this acquisition technique and can be implemented with other acquisition techniques. The invention applies in particular to satellites that contain an opto-electronic matrix array (satellites in scrolling, geostationary or astronomy orbit), provided that it is possible to image, with the inclined matrix array and the nominal matrix array, the same scene using an optical device such as a mirror or else using the misalignment of the satellite or of the instrument.

The figures of the drawing diagrammatically show only the part forming the retina of an Earth observation satellite telescope, its optical part, like the retina's electrical signal conversion circuits, being produced in a conventional manner and not being shown in the drawing. The way the signal processing circuits implementing the defocusing measurement can be produced and, where appropriate, the way the low-frequency aberrations can be measured, will be clear to those skilled in the art upon reading the present description.

FIG. 1 diagrammatically represents a conventional telescope imaging optical device 1, the optical axis of which is referenced 2 and the plane, hereinafter called "focal plane", of which is referenced 3. The retina part of this imaging system of a telescope comprises, originally, in a first embodiment (FIGS. 1 and 2), a linear strip 4 of opto-electronic detector elements positioned in the focal plane 3 (and merged with the plot of this focal plane in the view of FIG. 1). In the present description, the term "sensor" denotes any opto-electronic component or any set of opto-electronic components that might be used in conjunction with an optical instrument, for example a telescope, to form an imaging system of the type mentioned hereinabove.

It should be noted that the focal plane 3 is not defined as the best focusing plane of the instrument's optics, but by the fact that it contains the nominal linear strip 4.

Figure 2:
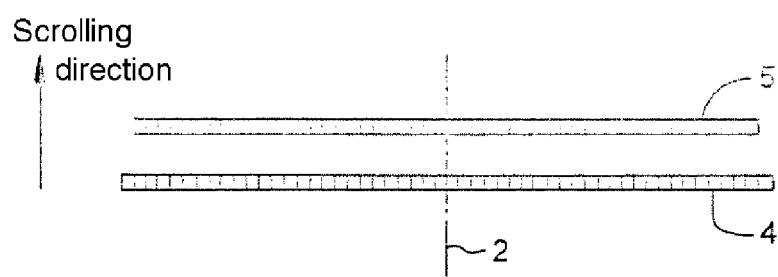
FIG. 2 is a plan view of the device of FIG. 1 in the case of a linear strip of detectors.

According to the invention, there is, close to the strip 4 and parallel to it, another linear strip 5 of detectors, usually similar to or shorter than the strip 4, which, in the present example, enters into the optical field of the optical device 1. It is considered that the strip 5 is parallel to the strip 4 inasmuch as their projections onto a plane perpendicular to the optical axis 2 are parallel to one another, as shown in FIG. 2. However, the strip 5 is not contained in the plane containing the strip 4 and perpendicular to the optical axis, and it intersects it only by a straight line, the plot 6 of which can be seen in FIG. 1. Generally, this straight line 6 is contained in the two planes, each containing one of the two strips (or, more precisely, the sensitive surfaces of these strips, that can be assumed to be two-dimensional), but it does not necessarily pass through the middle of the length of each of these two strips. The plane of the strip 5 forms an angle $\alpha$ with the focal plane 3. The value of the angle $\alpha$ depends, according to the measurement method adopted, on the assessed maximum defocusing of the instrument and on the length of the strip, or, in the case of use of the so-called "phase diversity" method, of a fraction or of a multiple of the optical wavelength and of the length of the strip, the sine of the angle being the ratio between the maximum defocusing and half the length of the strip. Hereinafter, the strip 4 will also be called nominal strip, and the strip 5 will be called inclined strip. The point 6 is shown in the middle of the length of the strip 5 and on the axis 2, but such is not necessarily the case, and this point (which corresponds to the intersection of the strip 5 with the focal plane 3) may be distant from the axis 2 and/or not situated in the middle of the strip 5.

It will be noted that, in the example illustrated in the drawing, the strip 5 is close to the strip 4, but, in particular when there is insufficient space in the optical field of the device 1 in which to accommodate the strip 5, it can be positioned outside this field, and it can be made to receive the same region as that received by the strip 4 (not necessarily simultaneously for both strips) using an ancillary device such as a strip translational mechanism or an optical device such as a return mirror.

For the strip 5 to be able to receive the same region as the strip 4, it is possible to use the scrolling of the supporting satellite or else a maneuver of the supporting satellite, or use the tilting of the instrument, in order to displace the line of sight of the telescope so that the land region (or space region) that has just been imaged on the strip 4 is imaged immediately on the strip 5.

By virtue of the inclination of the strip 5 relative to the focal plane 3, along the strip, each pixel "sees" a different focusing, varying from $-d_{max}$ to $+d_{max}$. The parameter $d_{max}$ is an overestimation of the possible defocusing when the strips are in the best focusing plane of the instrument.

When the instrument is defocused with a defocusing d0 that is unknown, then:

the retina of the nominal strip is defocused by d0.

Along the inclined strip, the defocusing varies from $d0-d_{max}$ to $d0+d_{max}$, and the defocusing of a pixel i will therefore be $di=d0+i*d_{max}/i_{max}$ (assuming that the index i ranges from $-i$ to $+i_{max}$).

The inclined and nominal strips are parallel and therefore see the same landscape barring a time Y offset of the strips according to the direction of the scrolling speed (in "pushbroom" mode). The ratio Ri(f) between the PSD (Power Spectral Density, calculated according to a prior art method) of the image obtained by the inclined strip and the PSD of the image obtained by the nominal retina for a given column i for a space frequency f in the images (said PSDs of the images being corrected by an estimation of the PSD of the acquisition noise assessed according to the state of the art) is then:

$$R_i(f) = \frac{DSPpc_i(f)FTMdefoc(di+d0)(f)^2}{DSPpc_i(f)FTMdefoc(d0)(f)^2}$$

$$= \frac{FTMdefoc(di+d0)(f)^2}{FTMdefoc(d0)(f)^2}$$

In this expression, FTMdefoc(d)(f) is the modulation transfer function of the instrument for a space frequency concerned f and for a defocusing d, that is to say that it qualifies the fuzziness of the image obtained, di is the relative defocusing of a pixel or of a column of pixels of rank i of the inclined sensor relative to the nominal sensor, defocusing which is a linear function of i*sine $\alpha$ according to the expression: di=i*width of the pixel on the inclined strip*sine $\alpha$ (in which i is counted from the center of the inclined strip, i.e. which has the same defocusing as that of the nominal strip) and $PSDpc_i(f)$ is the PSD of the landscape portion seen by the column i for the space frequency f. Because the PSD of the landscape of the column i is in the numerator and the denominator, it is eliminated from Ri and is not involved.

This ratio will be at maximum for the column i0 of best focusing, and the value of the defocusing of the instrument d0=-di0 (di0 is the relative defocusing of the column i0 on the inclined sensor) is deduced therefrom. The search for the maximum value of Ri(f) therefore directly gives the defocusing d0 of the instrument.

This is valid for any frequency f. Since the defocusing has an impact in FTM mode at high frequencies, it is possible to choose f or else calculate the ratio in a frequency band (fa,fb) close to half the sampling frequency. It will be noted that, because the PSD of the noise of the detector and the spectral aliasing can disturb the measurement of Ri, half the sampling frequency is not necessarily the best possible analysis frequency. An optimization of the analysis frequency band is possible given the FTM characteristics of the optic and of the noise of the detector.

Obviously, the method can be adapted, assuming that the defocusing is practically constant over adjacent groups of pixels of the inclined strip. The PSD of each group of columns is then used.

It should be noted that the lengths of the strips concerned can be very long (several thousand pixels), which enhances the accuracy of the method.

Figure 3:
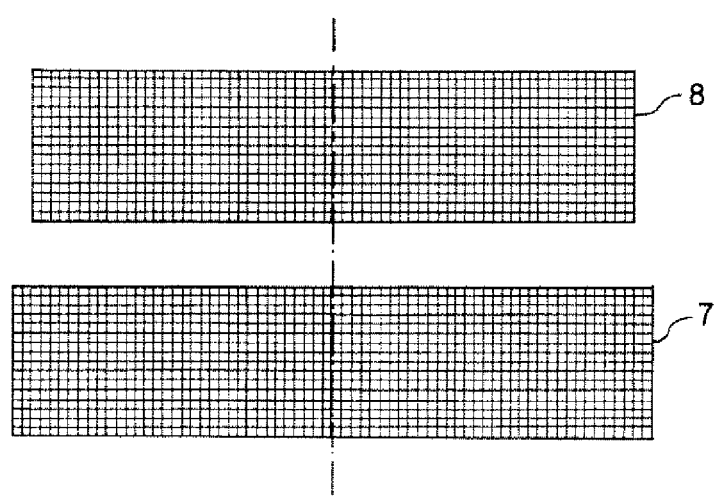
FIG. 3 is a plan view of the device of FIG. 1 in the case of detectors arranged in a matrix array.

According to a variant of the invention, when the optoelectronic sensor comprises, as diagrammatically represented in FIG. 3, a nominal rectangular matrix array 7 of optoelectronic detector elements, there is positioned parallel to the latter another rectangular matrix array 8 (identical or not) inclined in the same way as the strip 5 is relative to the strip 4.

According to another variant of the invention, the so-called "phase diversity" method is implemented for each pair of subimages of one and the same scene or of the same object. The expression "pair of subimages" should be understood to mean a subimage given by the inclined strip and the corresponding subimage (which sees the same object or region of the landscape) from the nominal strip (flat), said subimages being defocused by a value that is practically constant within each subimage provided that the angle α is fairly small, but having different defocusing between pairs according to the position of the subimage on the inclined sensor, and by virtue of an averaging or weighted averaging of the results of the implementation of the optical aberration measurement algorithms of the phase diversity method according to the prior art, a great improvement is obtained in the accuracy of the final results of this "phase diversity" method. The subimages are, advantageously, thumbnail images of a few tens of pixels per side, for example 150 pixels. Over these 150 pixels, the defocusing should be almost constant (which is true if a is small). There are then obtained (N/150) different pairs (N=number of pixels of the strip). Fewer pairs can be taken, the choice being made in particular according to a criterion dependent on the gradient of the landscape within each subimage to eliminate the almost uniform scenes, or by spacing them apart, to choose therefrom, for example, half the total number. From each pair, the phase diversity is used to extract the low-frequency aberrations of the optic: defocusing, coma, astigmatism, etc. The average of the M results (M=N/(150*2)) is calculated to improve the accuracy of these aberrations, which makes it possible to obtain an accurate measurement.

In the embodiments described hereinabove, it is important to be able to associate an object seen by the nominal strip with the same object seen by the inclined strip. In other words, there must be a sub-pixel correlation between the two subimages. Now, if the two strips are fairly wide apart, there may be geometrical disturbances due in particular to the drift of the AOCS (Attitude and Orbit Control System) and due to the microvibrations which run the risk of deregistering the images (that is to say that they are no longer superimposed for certain platform configurations). This problem is conventionally resolved by, on the one hand:

either modeling of the deformations between the two images by a model of the onboard instrumentation (using in particular the AOCS measurements if they are fairly accurate), or direct modeling from image to image by image correlations from which a correlation model is constructed (well known in image processing), and, on the other hand, by a possible resampling of the pairs of images in the same geometry using the interpolator best suited to conserving the PSD of the images.

Thus, by virtue of the simple addition of an inclined strip and a few calculation circuits, a large number of pairs of defocused images is created (with different defocusing deltas), which makes it possible to have a very good resolution for determining the main aberrations affecting the optic common to both sensors.

According to an advantageous characteristic of the invention, the measuring device is implemented in a device for correcting the abovementioned optical defects (due in particular to the thermoelastic deformations and to offgassing), in order to produce an autofocus optical instrument. This measuring device is then inserted into a locked loop comprising in particular a device (mechanical, thermal or optical) for compensating the deformations due to the optic of the nominal strip. Since the production of such a correction device is dependent on the characteristics of the instrument, it will not be described here in more detail.

The invention claimed is:

1. A static device for measuring optical defects of an imaging instrument comprising:
a first sensor having a number of detector elements for imaging a region;
a second sensor having a number of detector elements positioned in a second plane that is inclined relative to a first plane containing said first sensor and relative to an optical axis of the imaging instrument, said second plane including a straight line linking said two sensors and that is also contained within said first plane containing said first sensor, said second sensor imaging the same region as said first sensor by using means for imaging said same region on said first sensor and said second sensor at two different instants in time, and
a device for calculating any number of optical aberrations affecting each detector element of the two sensors.

2. The device as claimed in claim 1, applied to the measurement of defocusing phenomena, further comprising means of calculating a defocusing value, which is given by a maximum value of a ratio of power spectral densities (PSD) of images obtained by columns or groups of columns of the two sensors and corrected by an estimation of the PSD of acquisition noise, this ratio ($R_i(f)$) being given by:

$$R_i(f) = \frac{FTMdefoc(di+d0)(f)^2}{FTMdefoc(d0)(f)^2}$$

in which: d0 is the defocusing value of the first sensor, di is the relative defocusing of a pixel or column of pixels of rank i of the second sensor relative to the first sensor, defocusing which is a linear function of i*sine α according to the expression: di=i*width of the pixel on the inclined strip*sine α, i being counted from the center of the inclined strip, FTMdefoc (d) is the modulation transfer function for a space frequency f and a defocusing d of the images.

3. The device as claimed in claim 1, wherein an angle of inclination (α) of the first sensor relative to the second sensor is a function of an assessed maximum defocusing of the imaging instrument.

4. The device as claimed in claim 1, further comprising means implementing a phase diversity method.

5. The device as claimed in claim 4, wherein an angle of inclination (α) of the first sensor relative to the second sensor is a function of a defocusing necessary to the implementation of the phase diversity method.

6. The device as claimed in claim 1, wherein the two sensors are linear strips of opto-electronic detector elements.

7. The device as claimed in claim 1, wherein the two sensors are rectangular matrix arrays of opto-electronic detector elements.

8. A device for correcting optical aberrations of an imaging instrument with opto-electronic sensor, comprising, in a locked loop, a device for measuring these defects as claimed in claim 1.

9. The device as claimed in claim 1, positioned in an opto-electronic instrument mounted onboard a spacecraft.

10. The device as claimed in claim 1, positioned in an opto-electronic instrument mounted onboard an airplane, helicopter or drone.

11. The device as claimed in claim 1, wherein said instrument is located on a satellite in drift orbit and comprises a telescope having a visual axis, wherein acquisition of images by said first sensor and said second sensor is carried out as a result of the drift of said satellite generating a displacement of the visual axis of said telescope.

12. The device as claimed in claim 1, wherein said instrument is located on a satellite and comprises a telescope having a visual axis, wherein acquisition of images by said first sensor and said second sensor is carried out during a maneuver of said satellite that generates a displacement of the visual axis of said telescope.

* * * * *

UNITED STATES PATENT AND TRADEMARK OFFICE
CERTIFICATE OF CORRECTION

PATENT NO. : 8,415,599 B2  Page 1 of 1
APPLICATION NO. : 12/742614
DATED : April 9, 2013
INVENTOR(S) : Pigouche et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this
First Day of September, 2015

Michelle K. Lee
*Director of the United States Patent and Trademark Office*